United States Patent
Murata et al.

(10) Patent No.: US 7,042,662 B2
(45) Date of Patent: May 9, 2006

(54) LIGHT AMOUNT ADJUSTING DEVICE, AND OPTICAL DEVICE USING THE LIGHT AMOUNT ADJUSTING DEVICE

(75) Inventors: Yasunori Murata, Tokyo (JP); Susumu Abe, Kanagawa (JP); Daisuke Ito, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/744,397

(22) Filed: Dec. 23, 2003

(65) Prior Publication Data

US 2004/0135921 A1   Jul. 15, 2004

(30) Foreign Application Priority Data

Dec. 26, 2002  (JP) .............................. 2002-377111
Jun. 26, 2003  (JP) .............................. 2003-183616

(51) Int. Cl.
    *G92B 5/22*   (2006.01)
(52) U.S. Cl. ........................................ 359/888; 359/885
(58) Field of Classification Search ................ 359/885, 359/888–889; 396/108, 164
    See application file for complete search history.

(56) References Cited

U.S. PATENT DOCUMENTS 3,943,019 A * 3/1976 Krekeler et al. ............... 156/99
6,078,442 A * 6/2000 Tada et al. .................. 359/890
2002/0176183 A1* 11/2002 Erz et al. .................... 359/885
2003/0011910 A1* 1/2003 Weiss ......................... 359/891
2003/0086014 A1  5/2003 Murata et al. ............... 348/363

FOREIGN PATENT DOCUMENTS

| GB | 2027925 | * | 2/1980 |
| JP | 52-117127 | | 10/1977 |
| JP | 05-281593 | | 10/1993 |
| JP | 06-265971 | | 9/1994 |
| JP | 2000-106649 | | 4/2000 |

* cited by examiner

Primary Examiner—Leonidas Boutsikaris
(74) Attorney, Agent, or Firm—Morgan & Finnegan, L.L.P.

(57) ABSTRACT

To provide an ND filter and a light amount adjusting device, in which a deterioration of optical performance of an optical system is small, and in addition, an optical system having the light amount adjusting device, and an optical device having the optical system. More specifically, an ND filter according to the present invention includes: a base that transmits light having a predetermined wavelength $\lambda$; and a filter member selectively formed on the base, in which: a transmittance of the filter member gradually changes in a region in a predetermined direction; and a phase difference which is produced between light transmitting through the filter member and light transmitting through a region on the base in which the filter member is not formed is $\lambda/5$ or less in a boundary of the filter member.

14 Claims, 16 Drawing Sheets

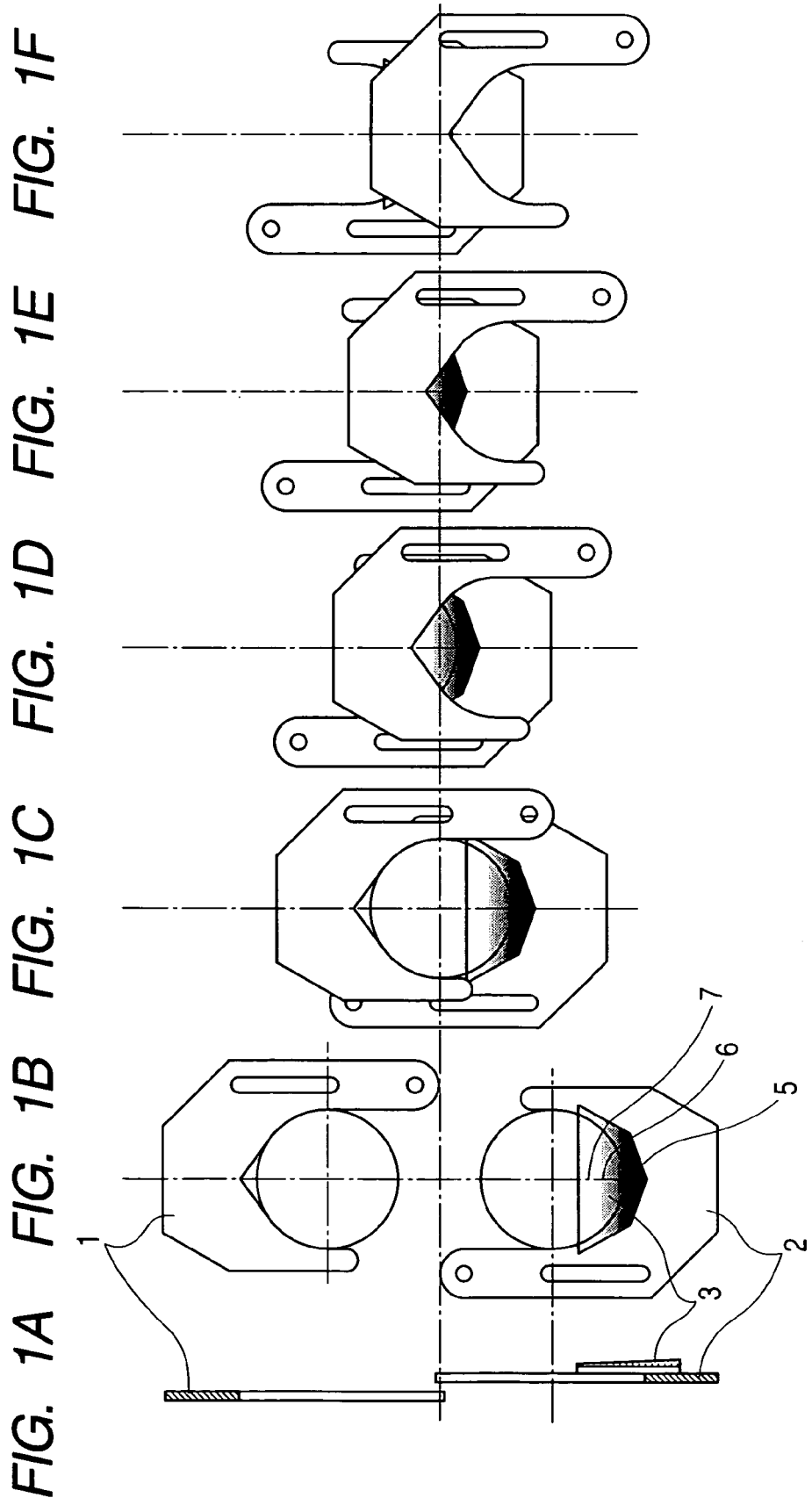

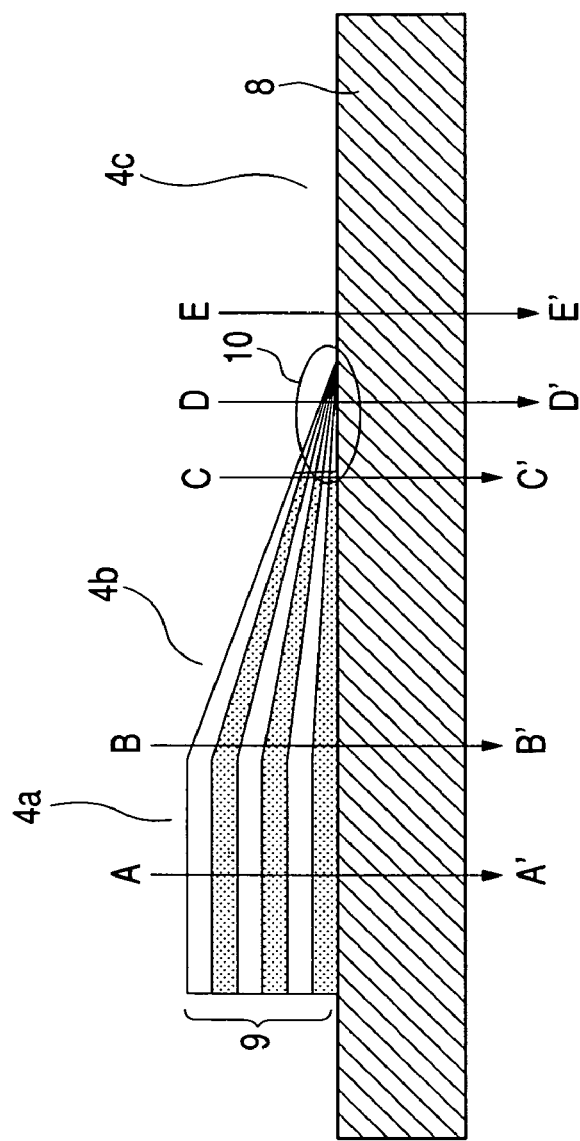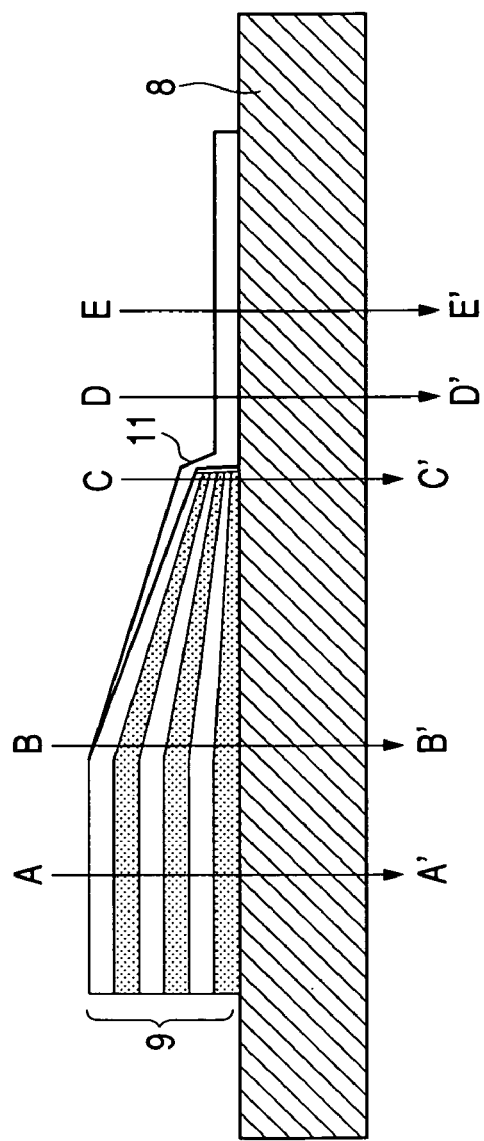
FIG. 2A
FIG. 2B

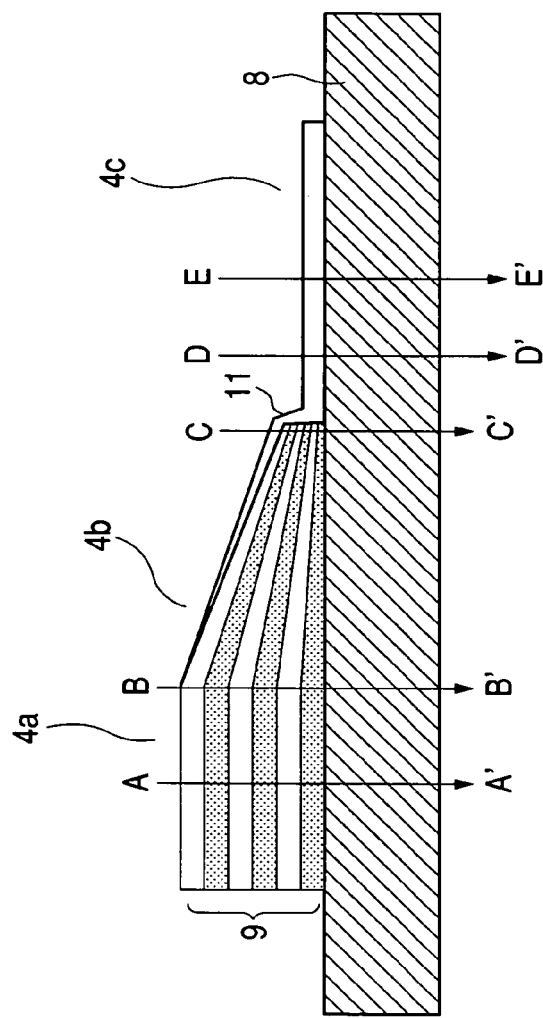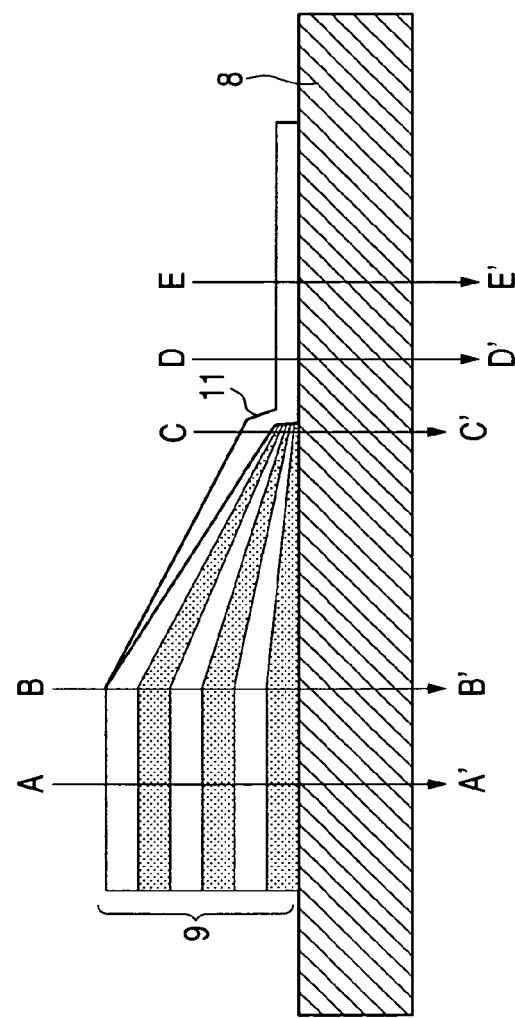

LIGHT AMOUNT ADJUSTING DEVICE, AND OPTICAL DEVICE USING THE LIGHT AMOUNT ADJUSTING DEVICE

BACKGROUND OF THE INVENTION

1. Field of the Invention

The present invention relates to an ND (neutral density) filter used for a light amount adjusting device suitable for an imaging apparatus such as a video camera or a digital still camera and a method of manufacturing the ND filter, and to a technique capable of suppressing deterioration of optical performance even in an image pickup element having a small pixel pitch.

2. Related Background Art

A light amount adjusting device (diaphragm device) that changes a diameter of a diaphragm aperture formed by a plurality of diaphragm blades to adjust a light amount is used for an imaging optical system of an optical device such as a video camera. In such a diaphragm device, in the case where the aperture diameter becomes too small at the time when imaging is conducted on a high intensity object, deterioration of optical performance due to light diffraction becomes a problem.

Therefore, in order to prevent the aperture diameter from becoming too small even in the case where the imaging object is light, a light amount adjusting device using diaphragm blades in combination with an ND filter has been proposed and used in practice.

A diaphragm device disclosed in Japanese Patent Application Laid-Open No. H05-281593 is as follows. An ND filter is bonded to diaphragm blades to be positioned r in a diaphragm aperture formed by the diaphragm blades. The ND filter has a first region to which uniform transmittance is set and a second region whose transmittance successively changes. When the diaphragm aperture of the diaphragm device becomes a set small diaphragm aperture, only the first region of the ND filter is positioned in the diaphragm aperture formed by the diaphragm blades.

A diaphragm device disclosed in Japanese Patent Application Laid-Open No. S52-117127 is as follows. A fully-opened state of a diaphragm aperture to a state thereof with a predetermined aperture area is achieved by moving mechanical diaphragm blades. In small diaphragm control of no more than a predetermined diaphragm value, an ND filter whose light transmittance successively changes according to a density is approached to an aperture such that a filter portion having high transmittance first reaches the aperture.

According to Japanese Patent Application Laid-Open No. 2000-106649, the influence of a diffraction phenomenon on optical performance, resulting from the transmittances of an ND filter having a plurality of density regions, is described and an image pickup apparatus having an exposure control mechanism with measures against the influence being taken is disclosed.

In the cases of these conventional proposals, with respect to a main factor for the deterioration of optical performance in an intermediate diaphragm state of a diaphragm aperture, which includes a fully-opened state to a small diaphragm state, it is considered that the influence of diffraction resulting from a difference of the transmittances of the ND filter covering the aperture portion formed by the diaphragm blades is dominant. Thus, in the case of the ND filter having the plurality of density regions, measures against the influence of diffraction with attention to transmittances of the respective density regions and aperture areas have been proposed.

However, a factor for the deterioration of optical performance in the intermediate diaphragm state includes not only the influence of diffraction resulting from the difference of the transmittances of the ND filter but also the large influence of a phase difference of transmission wave front resulting from a thickness of the ND filter.

In this point, a phenomenon in which optical performance deteriorates in the case where a part of a diaphragm aperture portion is covered with a thick filter has been experimentally known. However, an example in which the influence of the thickness of the filter on the optical performance is analyzed and the concrete measures are taken has not been known.

According to Japanese Patent Application Laid-Open No. H06-265971, a structure has been proposed in which an ND filter having a transparent portion and a portion whose transmittance successively or stepwise changes is moved with a state in which the ND filter covers the entire fixed circular diaphragm aperture, thereby adjusting a light transmission amount, as a measure for avoiding the influence of the thickness of the ND filter on the optical performance.

The invention described in Japanese Patent Application Laid-Open No. H06-265971 focuses attention on only a large phase difference produced between a portion in which light transmits through an aperture and a filter member and a portion in which light transmits through the aperture but does not transmit through the filter member (transmits through a plain portion). It is described in Japanese Patent Application Laid-Open No. H06-265971 that the large phase difference becomes an aberration, thereby deteriorating imaging performance. However, there is no description with respect to a phase difference of transmission wave front of light transmitted through the filter member and whose density changes. In other words, there are no suggestions with respect to problems that arise in the case of actually realizing an ND filter in which transmittances change, and measures therefor, the problems being related to a minute phase difference of transmission wave front (equal to or less than a light wavelength), resulting from a minute change in thickness or a minute change in refractive index of the ND filter which will be caused in order to provide a change in transmittance.

According to the study made by the inventors of the present invention, it was found that a minute phase difference of transmission wave front equal to or less than the order of light wavelength greatly influences the optical performance under a certain condition.

Also, it was found that the appearance of the influence of the phase difference of transmission wave front on the optical performance is different from that of the influence of a density difference between adjacent transmittance regions of the ND filter on the optical performance.

Accordingly, the optical performance is greatly influenced under a certain condition due to the synergism of two components, the phase difference of transmission wave front and the density difference.

SUMMARY OF THE INVENTION

Therefore, an object of the present invention is to realize an ND filter and a light amount adjusting device, in which degree of deterioration of optical performance of an optical system is small.

More specifically, an ND filter according to the present invention includes:

a base that transmits light having a predetermined wavelength $\lambda$; and a filter member partially formed on the base, in which a transmittance of the filter member gradually changes in a predetermined direction, and a phase difference which is produced between light transmitted through the filter member and light transmitted through a region on the base in which the filter member is not formed is λ/5 or less in a boundary of the filter member.

Note that various features of the present invention will be apparent from the embodiments described later.

BRIEF DESCRIPTION OF THE DRAWINGS

FIGS. 1A, 1B, 1C, 1D, 1E, and 1F are schematic views showing a shape of an aperture formed by a filter member and diaphragm blades according to an embodiment of the present invention;

FIGS. 2A and 2B are sectional views showing a gradation ND filter according to a first embodiment;

FIG. 3 is a sectional view showing a gradation ND filter according to a second embodiment;

FIG. 4 is a sectional view showing a gradation ND filter according to a third embodiment;

DETAILED DESCRIPTION OF THE-PREFERRED EMBODIMENTS

Hereinafter, the present invention will be described reference to embodiments.

First, a gradation ND filter according to the respective embodiments of the present invention, a light amount adjusting device having the gradation ND filter, and an optical system having the gradation ND filter will be described.

Assume that an imaging lens is used for an image pickup element having an image size of 3 mm in diagonal and a pixel pitch of 2.5 μm. With respect to the specification of the imaging lens, a focal distance is set to 2.5 mm and F No. is set to 1.8. The imaging lens will be described as a stigmatic ideal lens.

Figure 5:
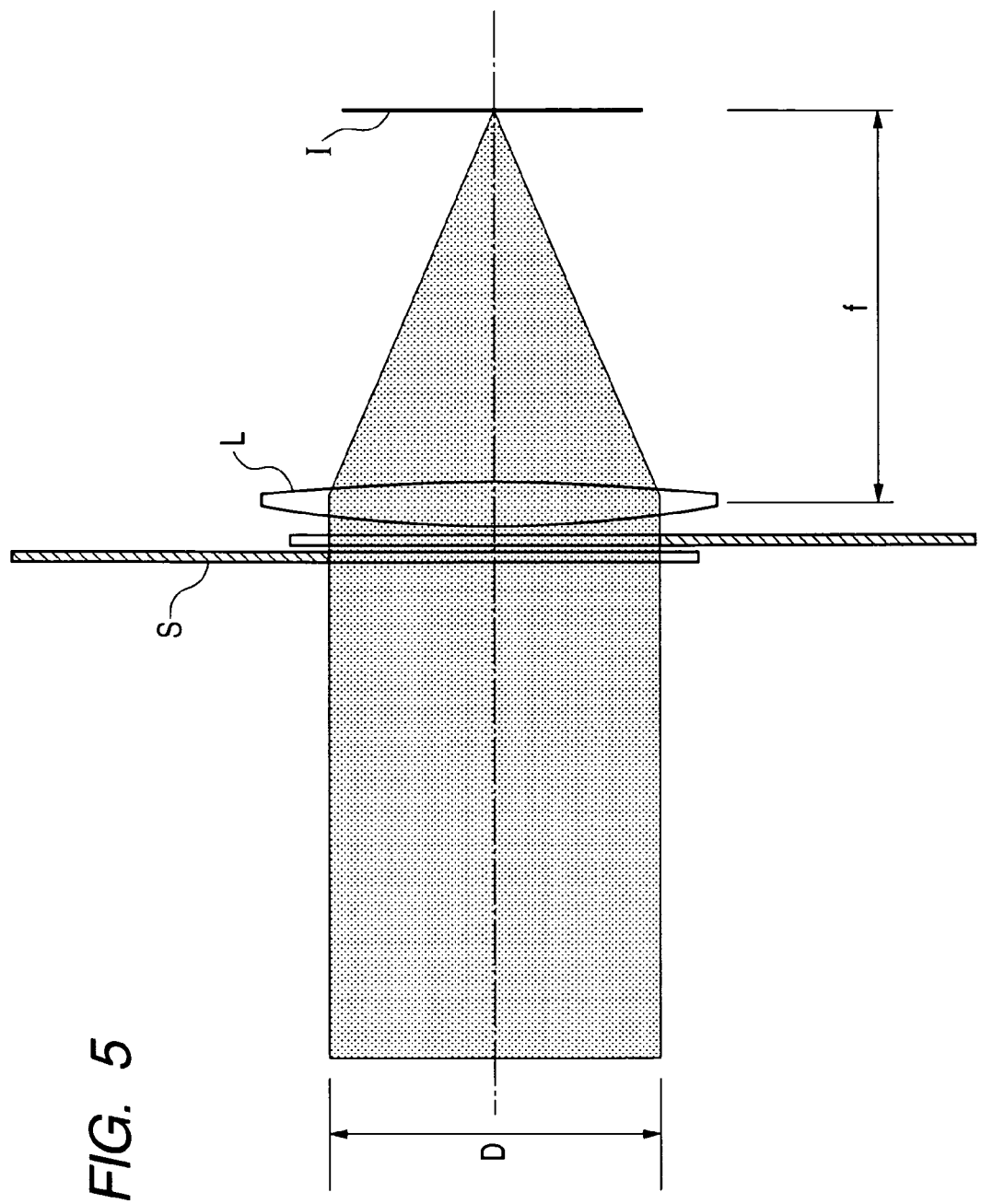
FIG. 5 shows an optical system having a light amount adjusting device according to the embodiment.

FIG. 5 is a sectional view showing the imaging lens. Amount of a light flux incident into a stigmatic ideal lens L is limited by a diaphragm device S to adjust an aperture diameter D for the incident light flux. The incident light flux is condensed by the ideal lens L and then imaged onto an image surface I which is located at a focal distance f.

The diaphragm device S is the light amount adjusting device. In the case where the light amount adjustment is conducted, a shape of a diaphragm aperture formed by a plurality of diaphragm blades is changed and an area of the diaphragm aperture covered with a filter member for reducing the amount of light transmitting through the diaphragm aperture is controlled.

Next, a specific structure of the diaphragm device S serving as the light amount adjusting device will be described with reference to FIGS. 1A, 1B, 1C, 1D, 1E, and 1F. FIG. 1A is a sectional view showing the diaphragm device S and FIGS. 1B to 1F show the cases where the diaphragm aperture of the diaphragm device is changed from a fully-opened state to a fully-closed state. The diaphragm device S is composed of diaphragm blades 1 and 2. When the diaphragm blades 1 and 2 are relatively actuated in the vertical direction with respect to the paper surface, the shape of the diaphragm aperture (area of the diaphragm aperture) formed by the diaphragm blades 1 and 2 changes. As shown in FIGS. 1A and 1B, a gradation ND filter 3 is fixed to the diaphragm blade 2. The gradation ND filter 3 will be described in more detail with reference to FIG. 2A. FIG. 2A is a sectional view showing the gradation ND filter 3. In the gradation ND filter 3, an ND evaporation film 9 for reducing a transmission light amount is formed on a portion of the surface of a filter base 8 which is transparent, has a film-like shape, and is made of a resin. The ND evaporation film 9 includes: a low transmittance region 4a in which the thickness of the ND evaporation film 9 is kept constant and which has a low and constant transmittance; and a gradation ND region 4b which is formed as a sloped film in a wedge shape by evaporation and in which the transmittance successively changes as the thickness of ND evaporation film 9 successively changes. A region in which the ND evaporation film 9 is not formed by evaporation is also present on the filter base 8. In this region, a reduction in transmission light resulting from the presence of the ND evaporation film 9 is not caused and a substantially constant and high transmittance is attained. Such region is referred to as a transparent region 4c. The filter base 8 is fixed to the diaphragm blade 2 such that the filter base 8 is located in the inner portion of the diaphragm aperture in the case where the diaphragm aperture is formed by the diaphragm blades 1 and 2.

With respect to the gradation ND filter shown in FIG. 2A, the transmittance of the low transmittance region 4a is 5.0%, the transmittance of the gradation ND region 4b successively changes from 6.3% to 79.4%, and the transmittance of the transparent region 4c is 90% or more.

Here, instead of the transmittance, a value of an ND density is defined as a value indicating a density of the ND filter. A relationship between the transmittance and the ND density is expressed by (transmittance=$10^{-(ND\ density)}$). Based on this relationship, the ND density of the low transmittance region 4a is 1.3 (=transmittance of 5.0%) and the ND densities of the gradation ND region 4b become 1.2 (transmittance of 6.3%) to 0.1 (transmittance of 79.4%). Hereinafter, the transmittance of the ND filter is indicated using the ND density.

FIGS. 1B to 1F show the cases where the diaphragm aperture of the diaphragm device is changed from a fully-opened state to a fully-closed state by actuating the diaphragm blades 1 and 2. FIG. 1B shows a state in the case where the diaphragm aperture is changed to the fully-opened state. FIG. 1C shows a state in the case where the aperture F No. of the diaphragm aperture is set to 1.8. FIG. 1D shows a state in the case where the aperture F No. is set to 3.3. FIG. 1E shows a state in the case where the aperture F No. is set to 5. FIG. 1F shows the fully-closed state in the case where the entire diaphragm aperture is covered with the diaphragm blades 1 and 2.

The ND evaporation film 9 formed on the filter base 8 is made from a multi-layer film in which a plurality of layers are laminated. Table 1 shows a material of each of the layers and a layer structure. Note that a mechanical (physical) film thickness and an optical film thickness (nd) of each of the layers are values related to the low transmittance region 4a.

TABLE 1

| Layer No. | Material | Refractive index (at 550 nm) | Mechanical film thickness d (nm) | Optical film thickness nd (nm) |
|---|---|---|---|---|
| 24 | air | 1.000 | | |
| 23 | SiO$_2$ | 1.453 | 68.06 | 98.89 |
| 22 | TiO | 2.186 | 4.40 | 9.62 |
| 21 | Al$_2$O$_3$ | 1.553 | 15.61 | 24.24 |
| 20 | TiO | 2.186 | 4.40 | 9.62 |
| 19 | Al$_2$O$_3$ | 1.553 | 46.88 | 72.80 |
| 18 | Ti$_2$O$_3$ | 2.091 | 2.80 | 5.85 |
| 17 | TiO | 2.186 | 4.40 | 9.62 |
| 16 | Al$_2$O$_3$ | 1.553 | 40.00 | 62.12 |
| 15 | TiO | 2.186 | 4.40 | 9.62 |
| 14 | Al$_2$O$_3$ | 1.553 | 51.00 | 79.20 |
| 13 | TiO | 2.186 | 4.40 | 9.62 |
| 12 | SiO$_2$ | 1.453 | 72.02 | 104.65 |
| 11 | TiO | 2.186 | 4.40 | 9.62 |
| 10 | Al$_2$O$_3$ | 1.553 | 23.00 | 35.72 |
| 9 | TiO | 2.186 | 4.40 | 9.62 |
| 8 | Al$_2$O$_3$ | 1.553 | 43.00 | 66.78 |
| 7 | Ti$_2$O$_3$ | 2.091 | 2.80 | 5.85 |
| 6 | TiO | 2.186 | 4.40 | 9.62 |
| 5 | Al$_2$O$_3$ | 1.553 | 15.10 | 23.45 |
| 4 | TiO | 2.186 | 4.40 | 9.62 |
| 3 | Al$_2$O$_3$ | 1.553 | 14.74 | 22.89 |
| 2 | TiO | 2.186 | 4.40 | 9.62 |
| 1 | Al$_2$O$_3$ | 1.553 | 57.00 | 88.52 |
| 0 | Base | | | |
| | Total | | 496.01 | 787.16 |

In the example shown in Table 1, the ND evaporation film 9 is composed of twenty-three layers and has a film structure in which the transmittance is 5% and the ND density is 1.3. The first layer to the twenty-second layer act to reduce the light amount at the constant transmittance over the entire visible light region. In the case where film thicknesses of the first layer to the twenty-second layer are proportionally reduced or proportionally increased, it is possible to change the ND density in the gradation ND region 4b.

However, if the optical film thickness of each of the layers exceeds $\lambda/4$, when the film thickness changes due to the presence of the sloped film, a variation in optical characteristic becomes larger. Therefore, it is preferable that the optical film thickness of each of the layers is suppressed to $\lambda/4$ or less. The twenty-third layer is a final layer which is in contact with air and provided to prevent surface reflection. It is desirable that the twenty-third layer is not the sloped film whose film thickness successively changes but a film having a constant film thickness.

FIG. 2A is the sectional view showing the gradation ND filter according to a first embodiment. Although the description is repeated, as shown in FIG. 2A, the ND evaporation film 9 is formed on the surface of the filter base 8 which serves as a filter member, has a film-like shape, and is made of a resin. The ND filter includes: the low transmittance region 4a which is a region in which the thickness of the ND evaporation film 9 is kept constant; the gradation ND region 4b in which the thickness of the ND evaporation film 9 successively changes (section B–B' to section C–C'); and the transparent region 4c in which the ND evaporation film 9 is not formed.

In FIG. 2A, the ND density of the low transmittance region 4a in which the thickness of the ND evaporation film 9 is largest among these regions becomes 1.3. In the gradation ND region 4b, the ND density is successively changed in a range of 1.2 to 0.1 due to the presence of the sloped evaporation film.

In the gradation ND region, the film thickness of each of the layers of the sloped film becomes smaller as the ND density decreases. However, if film thickness becomes too small, it is hard to control the film thickness of the multi-layer film, causing difficulty in maintaining a certain film thickness ratio among the respective layers and a certain layer structure. Therefore, for example, in the case where the ND density in the gradation ND region is successively changed in a range of 1.2 to 0, there is a problem in that in a region having the ND density of 0.1 or less, the film thickness is small and the layer structure and the film thickness ratio are disturbed, and a spectral characteristic tends to be unstable.

Thus, the region in which the spectral characteristic is unstable and the ND density is 0.1 or less is eliminated in this embodiment. More specifically, the sloped film is formed with a state in which a mask is made in contact with the surface of the filter base 8 so as to cover a region 10 shown in FIG. 2A, so that it is prevented to form the sloped film on the region 10. As a result, a phase difference is produced between light transmitting through the gradation ND region and light transmitting through the transparent region. This phase difference is referred to as a transmission wave front phase difference in a film thickness step portion of the ND evaporation film 9. A large transmission wave front phase difference becomes a cause of aberration, thereby deteriorating an optical performance. In this embodiment, the transmission wave front phase difference is suppressed to $\lambda/5$ or less, with the result that the degree of deterioration of the optical performance is suppressed to a level that a problem is not caused in practice. More specifically, the thickness of a boundary portion between the gradation ND region and the transparent region in the ND evaporation film 9 is adjusted.

Also, the twenty-third layer of the ND evaporation film 9 is a final layer which is in contact with air and provided to prevent surface reflection. In the gradation ND region, the twenty-third layer becomes the sloped film. In this state, a surface antireflection effect is unstable. Therefore, as shown in FIG. 2B, a reversely sloped antireflective film 11 is formed again on the final layer by evaporation. Note that the slope of the reversely sloped antireflective film 11 is reverse to that of the sloped film of the ND evaporation film 9 and an absolute value of the slope is equal to that of the slope of the sloped film of the ND evaporation film 9. Thus, the film thickness of the final layer is kept constant to stabilize the surface antireflection. Further, the final layer is formed in the transparent region by evaporation to obtain the surface antireflection effect.

With respect to the reversely sloped antireflective film 11, in the case where the ND density is 1.3, the optical film thickness is 787 nm and the mechanical film thickness is 496 nm. An optical path length difference is a difference between the optical film thickness and the mechanical film thickness, that is, 291 nm.

According to calculation using the wavelength $\lambda=550$ nm, the transmission wave front phase difference of light transmitting through the film thickness step portion becomes 0.53 $\lambda$. Because there is a substantially proportional relationship between the ND density and the film thickness, the ND density corresponding to the transmission wave front phase difference of 1/5 $\lambda$ becomes ND 1.3×0.2 $\lambda$/0.53 $\lambda$=ND 0.5.

Therefore, in the case where the transmission wave front phase difference is suppressed to 1/5 $\lambda$ or less, the ND density of a cut portion of the sloped film of the gradation ND film may be ND 0.5 or less.

Next, a second embodiment of the present invention will be described. FIG. 3 is a schematic sectional view showing an ND filter according to the second embodiment. The same references are used for portions common to FIGS. 2A and 2B. In the ND filter according to the second embodiment, the ND density of the low transmittance region 4a is 1.5. In addition, the ND density of the gradation ND region 4b (section B–B' to section C–C') successively changes from 1.5 to 0.5 along a direction from the low transmittance region 4a to the transparent region 4c. The ND evaporation film 9 is composed of twenty-three layers and materials of the respective layers are the same as those in the first embodiment. A film thickness of each of the layers is obtained by multiplying the film thickness of each of the layers in the first embodiment by 1.5/1.3 times.

In the gradation ND region, a sloped film having the ND densities of ND 1.5 to ND 0.5 is set. A film thickness portion having ND 0.5 or less is eliminated using a mask in film formation. The transmission wave front phase difference of $\lambda$/5 is produced in a boundary portion eliminated using the mask.

Next, a third embodiment will be described. FIG. 4 is a schematic sectional view showing an ND filter according to the third embodiment. The same references are used for portions common to FIGS. 2A and 2B. In the ND filter according to the third embodiment, the ND density of the low transmittance region 4a is 1.7. In addition, the ND density of the gradation ND region 4b (section B–B' to section C–C') successively changes from 1.7 to 0.1 along a direction from the low transmittance region 4a to the transparent region 4c. The ND evaporation film 9 is composed of twenty-three layers and materials of the respective layers are the same as those in the first embodiment. A film thickness of each of the layers is obtained by multiplying the film thickness of each of the layers in the first embodiment by 2.0/1.3 times.

In the gradation ND region, a sloped film having the ND densities ranging from ND 1.7 to ND 0.1 is set. A film thickness portion having ND 0.1 or less is eliminated using a mask in film formation.

Next, the influence of the light amount adjusting device including the gradation ND filter according to the respective embodiments described above, on the optical performances will be described.

First, an optical characteristic of a light amount adjusting device that has no ND filter and controls a light amount using only an aperture formed by diaphragm blades will be described as a comparative example. Next, an optical characteristic of a light amount adjusting device in which not a gradation ND filter whose ND density changes according to a position but an ND filter having a constant ND density is bonded to the diaphragm blades will be described. Lastly, an optical characteristic of the light amount adjusting device in which the gradation ND filter according to the respective embodiments of the present invention is bonded to the diaphragm blades will be described.

As described above, in this embodiment, assume that the imaging lens is used for the image pickup element having the image size of 3 mm in diagonal and the pixel pitch of 2.5 µm. With respect to the specification of the imaging lens, the focal distance is set to 2.5 mm and F No. is set to 1.8. The imaging lens will be described as the stigmatic ideal lens.

FIG. 5 is the sectional view showing the imaging lens. The light flux incident into the stigmatic ideal lens L is limited by the diaphragm device S to adjust the aperture diameter D for the incident light flux. The incident light flux is condensed by the ideal lens L and then imaged onto the image surface I which is located at the focal distance f.

In the case where the light amount adjustment is conducted, the shape of the diaphragm aperture of the diaphragm device S is changed and the area that the diaphragm aperture is covered with the filter member for reducing the amount of light transmitting through the diaphragm aperture is controlled.

A change in axial optical performance of the ideal lens during the light amount adjustment will be described. The optical performance is evaluated using a modulation transfer function (MTF). With respect to an MTF calculation condition, a wave engineering MTF calculation using white color weightings is conducted and an evaluation spatial frequency is set to 100 lines/mm.

The Nyquist frequency of the image pickup element having the pixel pitch of 2.5 µm is 1000/(2× 2.5 µm)=200 lines/mm. The evaluation spatial frequency used for the MTF calculation is set to a half of the Nyquist frequency.

Figure 6:
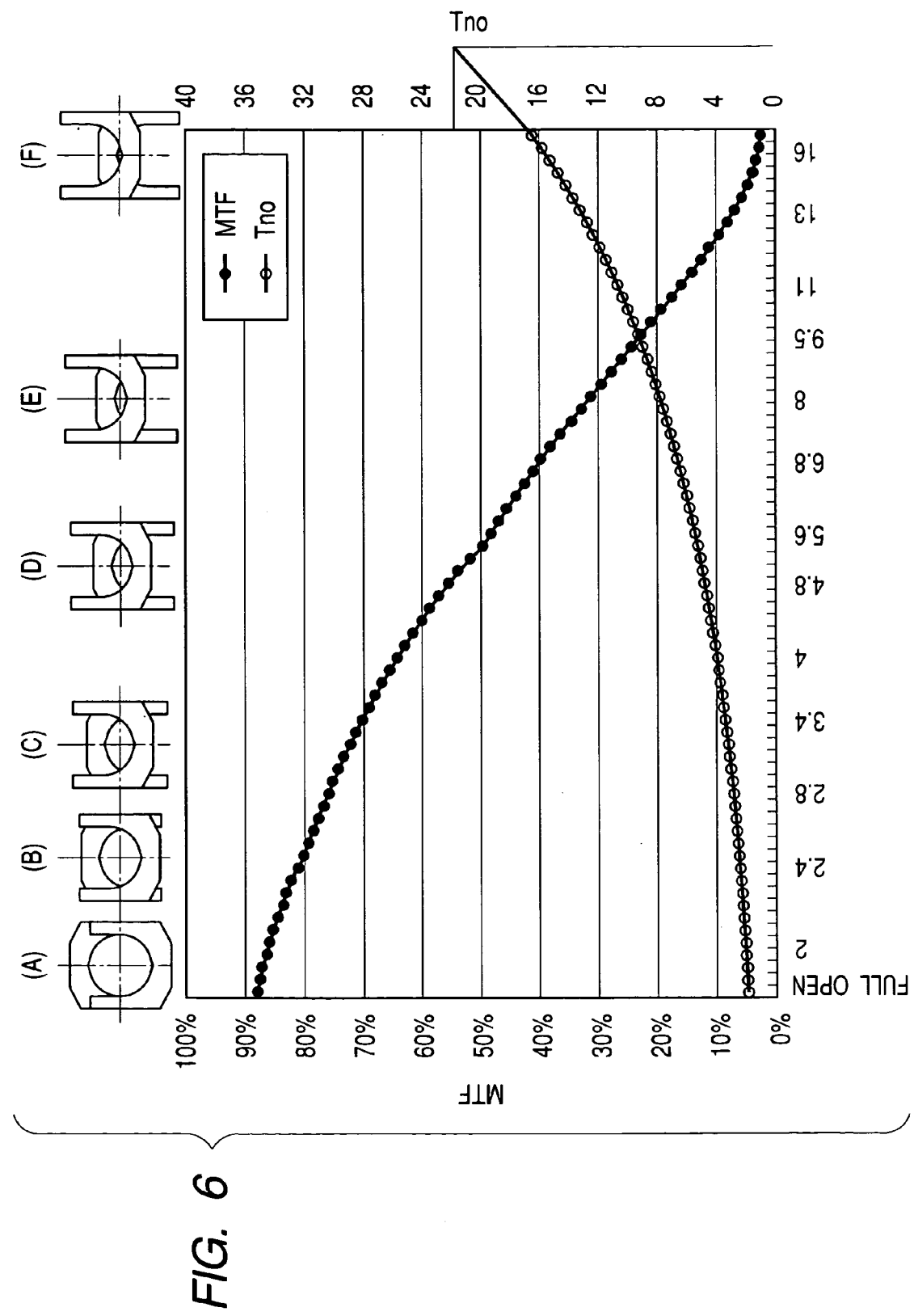
FIG. 6 is a graph showing an optical characteristic of a light amount adjusting device for which an ND filter is not used.

First, FIG. 6 shows a relationship between F No. and an MTF value indicating the optical performance in a comparative example in which an ND filter is not used for the stigmatic ideal lens, that is, in the case where the diaphragm aperture is changed from the fully-opened state F1.8 to the small diaphragm state F16 by only a change in shape of the diaphragm aperture formed by the two diaphragm blades.

In the graph shown in FIG. 6, the left ordinate indicates an MTF value, the abscissa indicates a diaphragm aperture F No. (F number), and the right ordinate indicates T No. (T number). Schematic image views of the shape of the diaphragm aperture are shown on the upper side of the graph. Each of the images (A) to (F) indicates an aperture state formed by the diaphragm blades in which (A) is the fully-opened state, (B) indicates a F2.4 state, (C) is a F3.3 state, (D) is a F5 state, (E) is a F8 state, and (F) is a F16 state.

The stigmatic ideal lens has a highest imaging performance in the case where the diaphragm is in the fully-opened state. The optical performance deteriorates as an aperture narrows because of the influence of diffraction. In the fully-opened state (A), the MTF value is 98%. The MTF value in the F2.4 state (B) in which the aperture is slightly narrowed deteriorates to 80%. The MTF value in the F3.3 state (C) in which the aperture is further narrowed deteriorates to 72%. The MTF value in the F5 state (D) deteriorates to 50%. The MTF value in the F8 state (E) deteriorates to 30%. In the F16 state (F) in which the aperture is further narrowed, the MTF value becomes 10% or less. In the case where the aperture is narrowed up to the F16 state (F), a subject image is not resolved at the evaluation spatial frequency. Therefore, such a stigmatic ideal lens cannot be adapted for a high brightness subject with the order of T No. 22.

Figure 7:
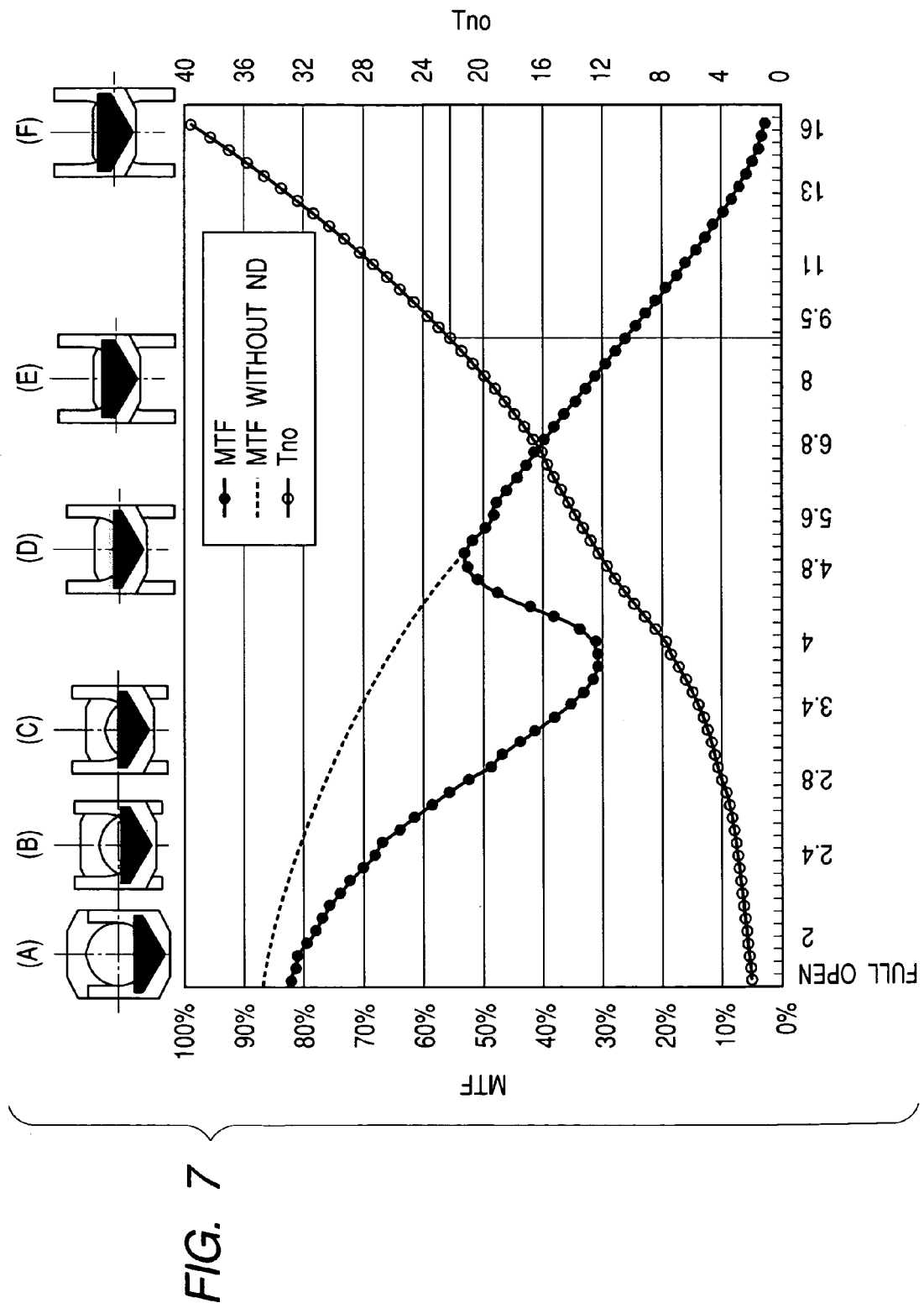
FIG. 7 is a graph showing an optical characteristic of a light amount adjusting device for which an ND filter having a constant ND density is used.

Next, in order to adapt the lens for the high brightness subject, an ND filter having a constant ND density of 0.8 (transmittance is 15.8%) is set to a size that the entire diaphragm aperture is covered in the case where the diaphragm aperture is in the F5 state (D) and bonded to one of the two diaphragm blades. FIG. 7 shows an optical characteristic of a light amount adjusting device including the ND filter. The ND filter is not a gradation ND filter whose ND density changes according to a position but an ND filter having a constant ND density.

The ND filter having the ND density of 0.8 (transmittance is 15.8%) is used in combination with the lens. Accordingly, even in the high brightness subject with the order of T No. 22, the MTF value of 26% can be ensured in the case where the diaphragm aperture is in the state of the order of F9. However, from the F3.3 state (C) before the ND filter covers the entire diaphragm aperture to the F5 state (D) in which the ND filter covers the entire diaphragm aperture, the MTF value reduces to 30% to temporarily, largely deteriorating the optical performance.

According to the study made by the inventors of the present invention, it was found that a large transmission wave front phase difference is produced between light that transmits through the aperture formed by the two diaphragm blades and the filter base of the ND filter and light that transmits through the aperture but does not transmit through the filter base (transmits through a plain portion), resulting from the thickness of the filter base, thus largely influencing the optical performance. Further, it was found that a minute transmission wave front phase difference is produced between light that transmits through the filter base and the film thickness step portion of the ND evaporation film and light that transmits through the filter base but does not transmit through the film thickness step portion (transmits through the transparent region) and largely influences the optical performance.

The influence of diffraction resulting from the ND density, the influence of the large transmission wave front phase difference resulting from the thickness of the filter base, the influence of the minute transmission wave front phase difference resulting from the order of the film thickness of the evaporation film, on the optical performance will be described using examples.

In the case where the ND filter having the constant ND density of 0.8 in which the optical performance shown in FIG. 7 is obtained is replaced by a gradation ND filter whose ND density gradually changes, remediation regarding the influence of diffraction resulting from the ND density on the optical performance was studied.

Figure 8:
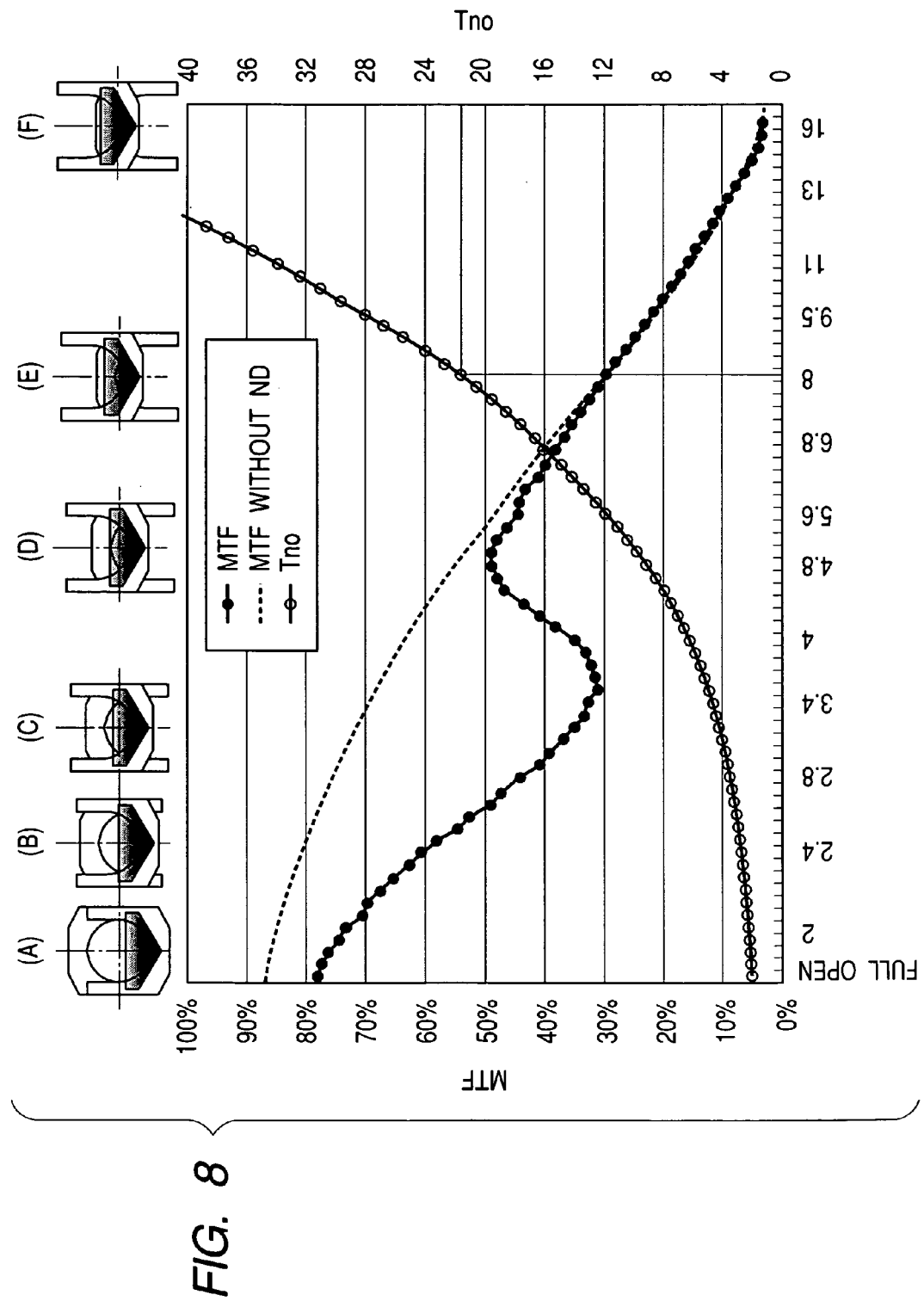
FIG. 8 is a graph showing an optical characteristic of a light amount adjusting device for which a gradation ND filter having ND densities of 0.2 to 1.2 is used.

FIG. 8 shows an example in which the ND densities of the gradation ND region are set to be in a range of 0.2 to 1.2. A weak point with respect to the MTF value is caused between the F3.3 state (C) and the F5 state (D) and the MTF value at the weak point is 31%, so that the remediation is hardly achieved. This is because the optical performance is largely deteriorated by the influence of the transmission wave front phase difference resulting from the presence of the film thickness step portion located on the filter base of the ND filter located in the aperture portion rather than the influence of diffraction resulting from the ND density.

Figure 9:
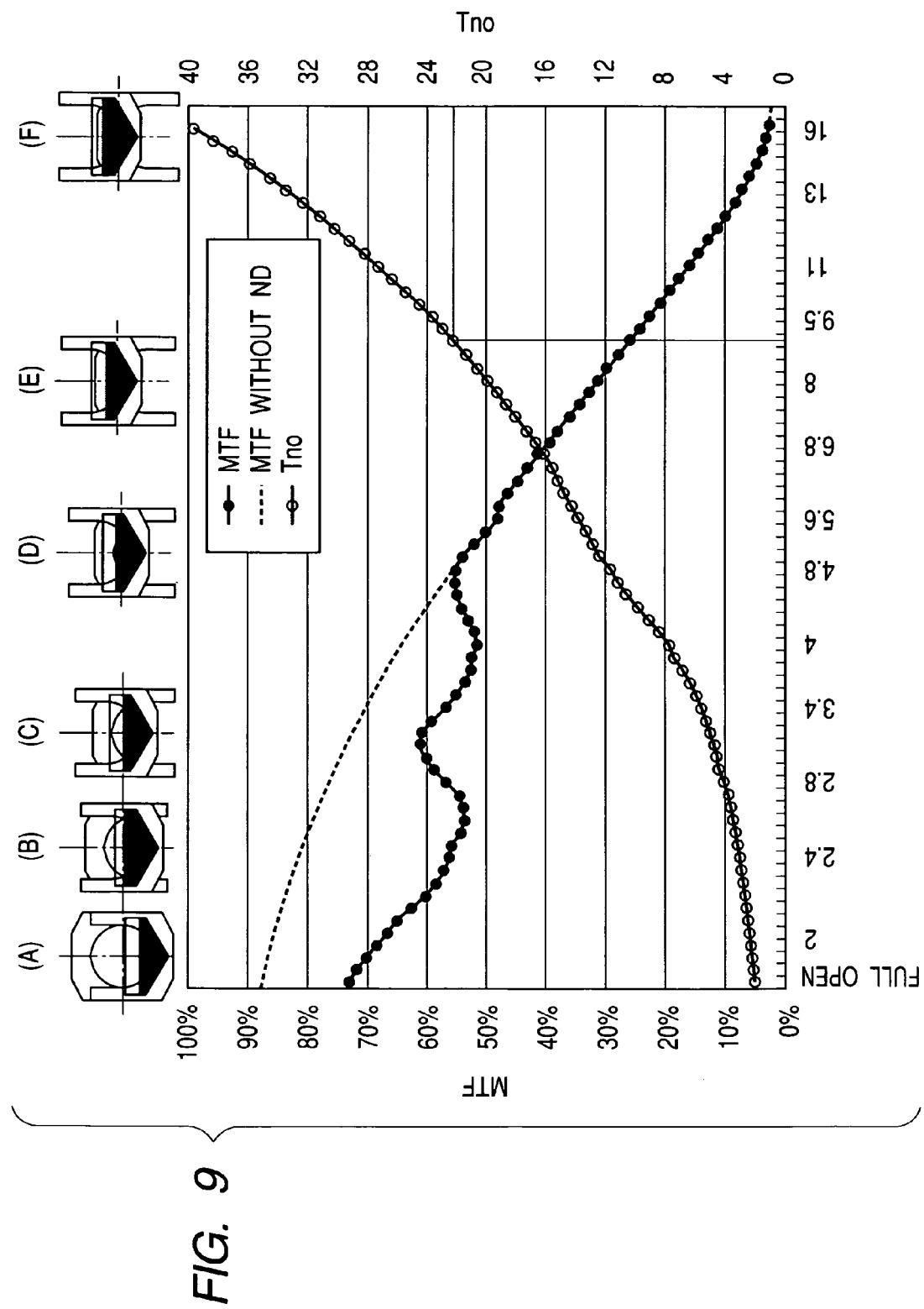
FIG. 9 is a graph showing an optical characteristic of a light amount adjusting device in which a transparent portion is provided to the ND filter having the constant ND density.

Next, in an example shown in FIG. 9, a transparent portion is provided to the ND filter having the constant ND density of 0.8 in which the optical performance shown in FIG. 7 is obtained and it is set such that the entire aperture is covered with the filter base at the F3.3 state (C). A transparent portion correcting film which has a film thickness substantially equal to an evaporation film thickness of an ND 0.8 portion of the ND evaporation film is provided to the ND filter. In addition, it is set so as not to produce the transmission wave front phase difference between light transmitting through the transparent portion and the light transmitting through the ND 0.8 portion. The ND filter of this type is influenced by the large transmission wave front phase difference resulting from the thickness of the filter from the diaphragm fully-opened state. Therefore, the optical performance deteriorates to the order of 52% from the fully-opened state (A) to the F2.4 state (B). However, the MTF value is 50% or more from the F3.3 state (C) in which the entire diaphragm aperture is covered with the ND filter to the F5 state (D), so that the degree of deterioration of the optical performance is small.

The above-mentioned result exhibits that the influence of the large transmission wave front phase difference resulting from the thickness of the filter base is larger than the influence of small diaphragm diffraction resulting from the aperture shape in the plain portion, which is formed by the ND 0.8 portion of the ND filter and the diaphragm blades. According to the study made by the inventors of the present invention, it was found that the optical performance is largely deteriorated by not only the influence of the large transmission wave front phase difference resulting from the thickness of the filter base but also the influence of the minute transmission wave front phase difference resulting from the order of the optical film thickness.

Figure 10:
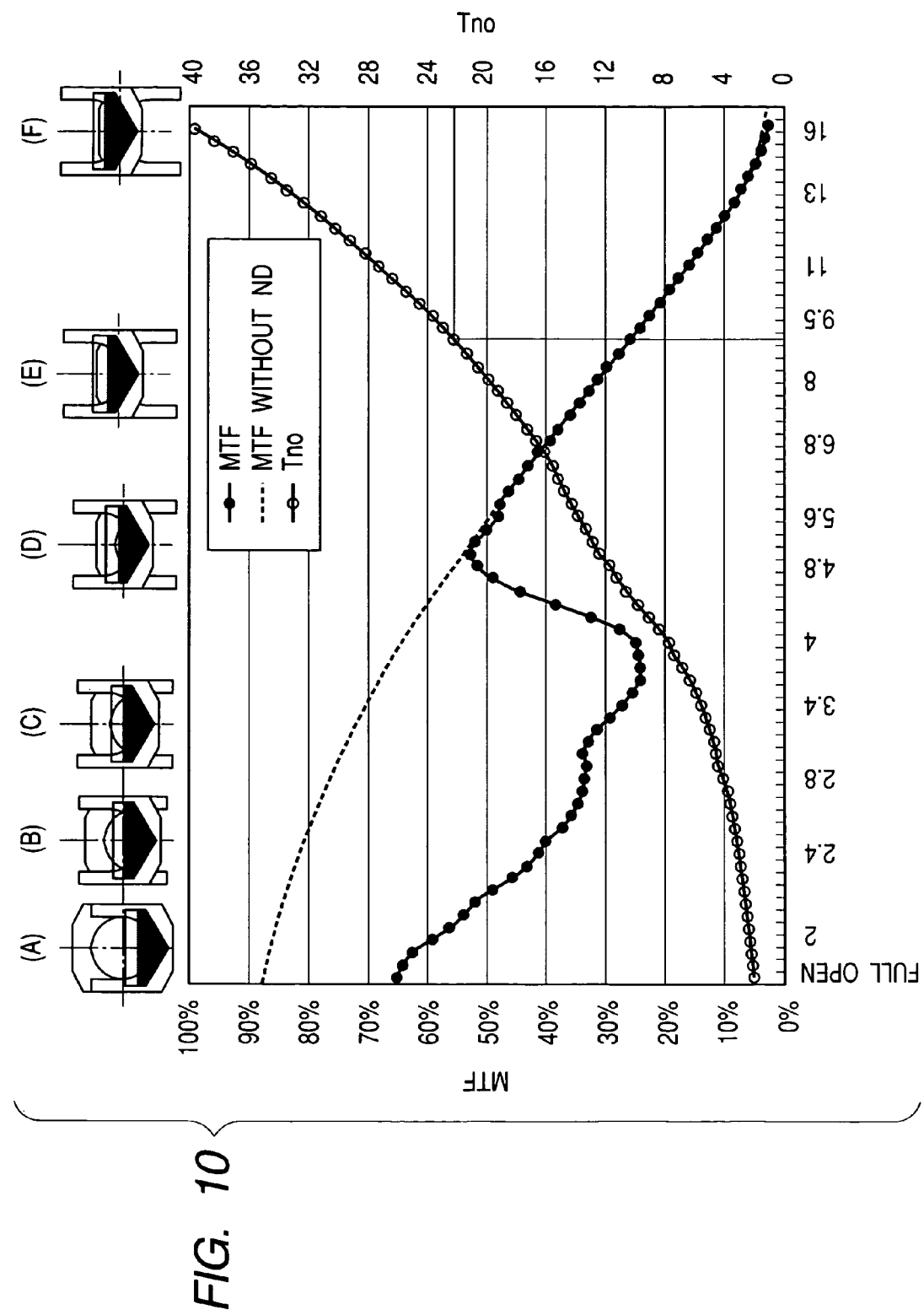
FIG. 10 is a graph showing an optical characteristic of a light amount adjusting device in which a transparent portion correcting film is removed from the ND filter of the light amount adjusting device having the optical characteristic shown in FIG. 9.

FIG. 10 shows the case where the transparent portion correcting film is omitted from the light amount adjusting device having the optical performance as shown in FIG. 9.

The transmission wave front phase difference is produced in a boundary portion between the transparent portion of the ND filter and the ND 0.8 portion of the ND evaporation film. In the case where the ND density of the ND evaporation film indicated in Table 1 is set to 1.3, the transmission wave front phase difference is 0.53 $\lambda$. Thus, the transmission wave front phase difference produced in the film thickness step portion having ND 0.8 becomes 0.33 $\lambda$. FIG. 10 shows a state in which the optical performance largely deteriorates by the minute transmission wave front phase difference.

The MTF value largely reduces to 23% from the F3.3 state (C) of the diaphragm aperture to the F5 state (D) in which the entire diaphragm aperture is covered with the ND 0.8 portion of the ND evaporation film. Because the entire diaphragm aperture is covered with the filter base, the optical performance is influenced by the transmission wave front phase difference resulting from the film thickness of the ND 0.8 portion of the ND evaporation film.

According to the study made by the inventors of the present invention, it was found that the degree of deterioration of the optical performance is maximized in the case where the minute transmission wave front phase difference is produced in a half region of the diaphragm aperture and the produced transmission wave front phase difference is $\lambda/2$.

This principle will be described by assuming light as a wave. In a state in which the phase of a light ray transmitting through the half region of the diaphragm aperture is shifted by λ/2, the phase of light transmitting through the half region, of light that will concentrate on an imaging point is shifted by λ/2. Therefore, a light intensity at the imaging point becomes zero due to canceling out of waves at the imaging point. However, light energy is not lost and the light that will concentrate on the imaging point becomes two point images separately formed near the imaging point. The optical performance deteriorates due to such a phenomenon.

In the case where the transmission wave front phase difference becomes 1 λ, the optical performance recovers to some extent, deteriorates at 1.5 λ again, and recovers at 2 λ to some extent. In the case where the transmission wave front phase difference is the order of 2 λ to 3 λ, the optical performance changes such that an amplitude periodically reduces. In the case where the transmission wave front phase difference is several λ or more, the optical performance does not periodically change but stabilizes. The degree of deterioration of the optical performance at this time is nearly equivalent to a value in the case where the transmission wave front phase difference of λ/4 is produced. The deterioration of the optical performance which is caused by the large transmission wave front phase difference resulting from the thickness of the filter base corresponds to this case.

On the other hand, the minute transmission wave front phase difference resulting from the presence of the evaporation film having the ND density of 0.8 is 0.33 λ, larger than λ/4, and close to λ/2 which is an adverse condition. Therefore, the degree of deterioration of the optical performance becomes larger than the influence of the thickness of the filter base.

Thus, the respective embodiments of the present invention focus attention on a reduction in transmission wave front phase difference. The gradation ND region composed of the sloped film is provided to the ND filter and the transmission wave front phase difference in the boundary portion between the transparent portion and the gradation ND region in the ND filter is reduced, so that the deterioration of the optical performance is suppressed.

Figure 11:
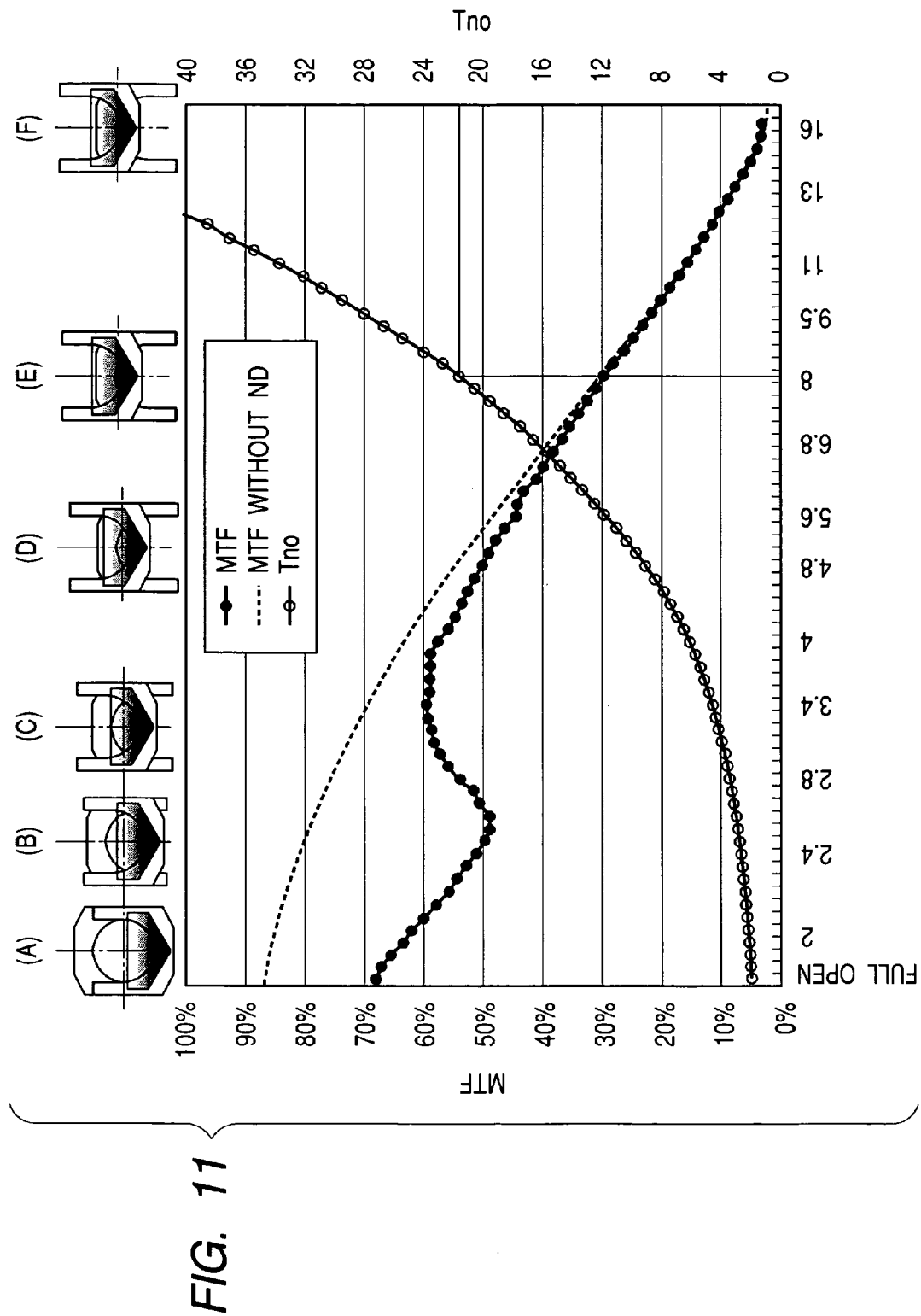
FIG. 11 is a graph showing an optical characteristic of a light amount adjusting device for which the gradation ND filter according to the first embodiment is used.

FIG. 11 shows a relationship between an MTF value and T No. in a light amount adjusting device including the gradation ND filter according the first embodiment.

The ND filter is set to a size that the entire diaphragm aperture is covered in the F3.3 state (C). The gradation ND region has the ND densities that range from 1.2 to 0.2 and is set to a size that covers the entire diaphragm aperture in the F5 state (D). The ND density difference in the boundary portion between the transparent portion and the gradation ND region is set to 0.2.

In the fully-opened state (A), because the boundary portion of the ND filter is located so as to open the diaphragm aperture half way, the MTF value reduces to 68% but is an acceptable level. Even in the diaphragm F2.4 state (B), the MTF value of 49% is maintained. Therefore, the optical performance is not deteriorated from the F3.3 state (C) to the F5 state (D) in which the deterioration of the optical performance has been a problem up to now. In addition, the MTF value increases to 59% and a preferable value is maintained. Further, in the diaphragm F8 state (E), the MTF value corresponds to T NO. 22 and the MTF value of 30% is maintained.

Figure 12:
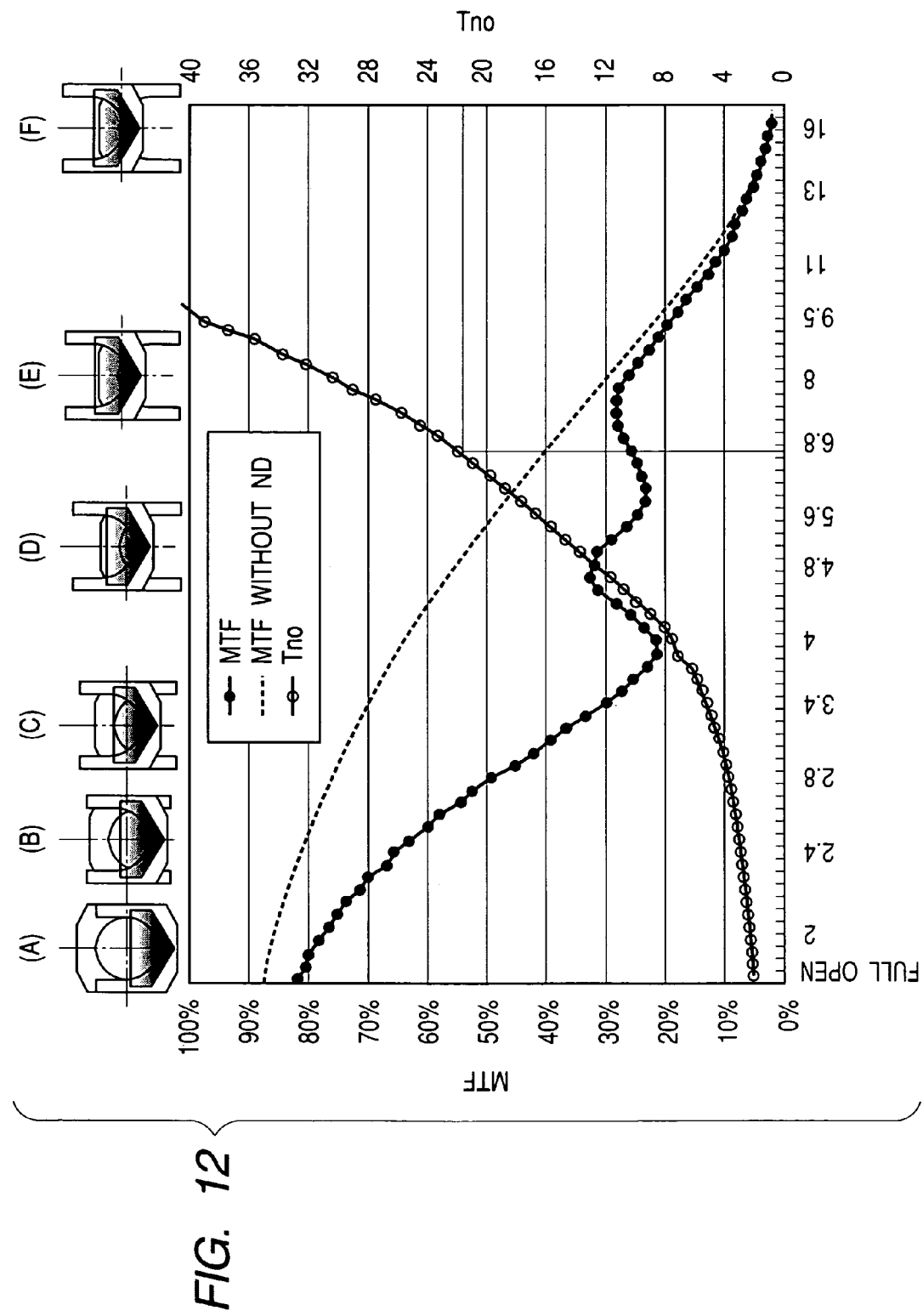
FIG. 12 is a graph showing an optical characteristic of a light amount adjusting device for which the gradation ND filter according to the second embodiment is used.

Next, FIG. 12 shows a relationship between an MTF value and T No. in a light amount diaphragm including the gradation ND filter according the second embodiment.

The ND densities of the gradation ND region are set to ND 1.5 to ND 0.5. This is the case where the ND density difference in the boundary between the transparent portion and the gradation ND region is ND 0.5. The transmission wave front phase difference in the boundary portion is λ/5.

From the F3.3 state (C) to the F5 state (D), the MTF value reduces to 22%. A main factor of the deterioration of the optical performance is because the transmission wave front phase difference of λ/5 is produced in the boundary between the transparent portion and the gradation ND region. As is apparent from this embodiment, even if the gradation ND region is used, in the case where the transmission wave front phase difference in the boundary portion is λ/5 or more, there is no effect to the improvement of the optical performance.

Figure 13:
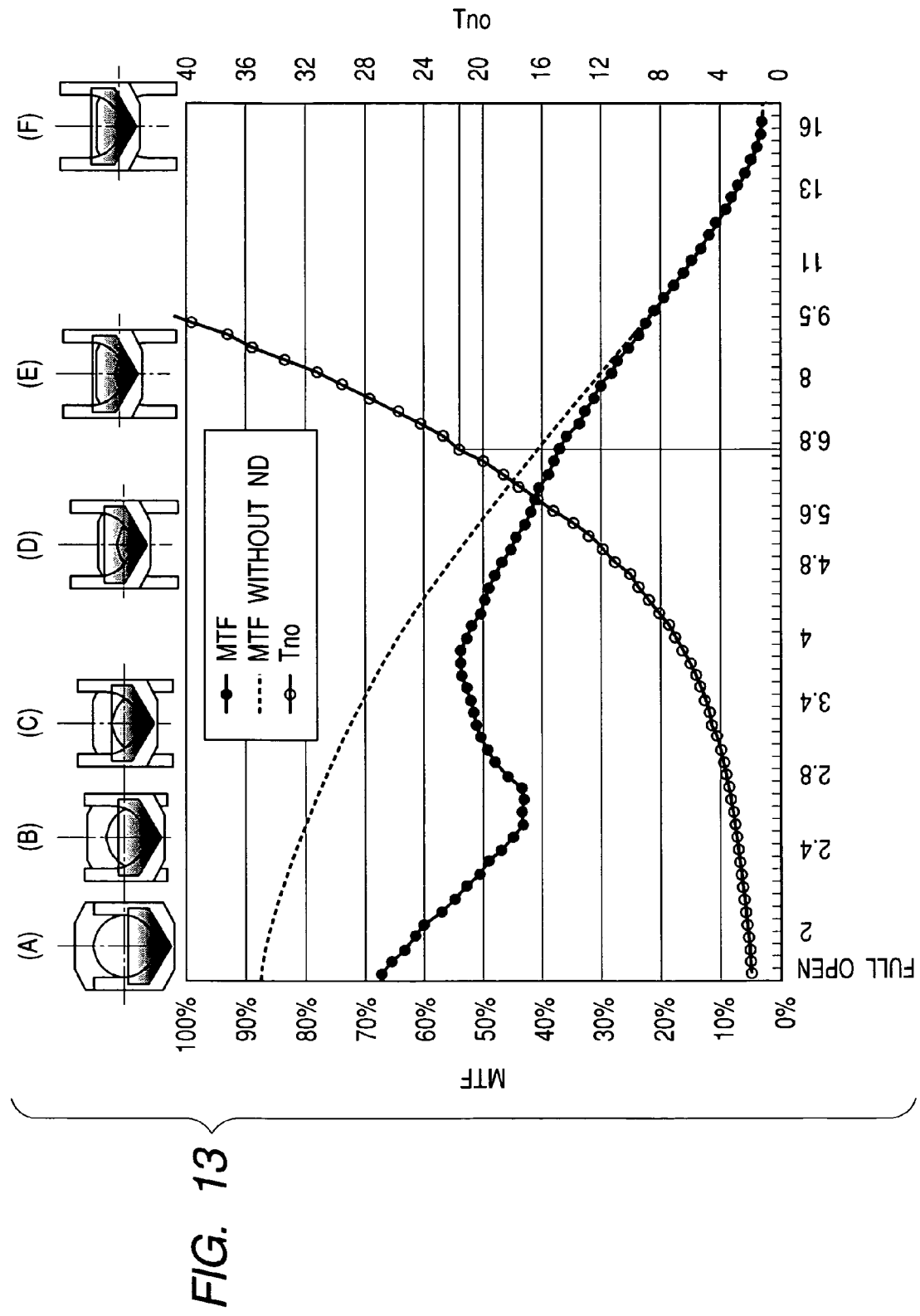
FIG. 13 is a graph showing an optical characteristic of a light amount adjusting device for which the gradation ND filter according to the third embodiment is used.

Next, FIG. 13 shows a relationship between an MTF value and T No. in a light amount diaphragm including the gradation ND filter according the third embodiment.

The ND densities of the gradation ND region are set to ND 1.7 to ND 0.2.

From the fully-opened state (A) to the F5 state (D), the MTF value of 42% or more is maintained and this is preferable. Because the ND density of a dense portion is ND 1.7 (transmittance is 2%), even in the T No. 22 state at the imaging of a high brightness object, the MTF value of 45% can be maintained in the case where the diaphragm aperture is in the F6.8 state. However, in the case where the ND density becomes higher than 1.7, the transparent portion and an ND 1.7 portion are present in the diaphragm aperture in an intermediate diaphragm state. Therefore, a difference in a light amount is produced between the upper side and the lower side of an imaging screen, so that a problem with respect to unevenness in light amount which is called shading is caused. Thus, it is preferable that the ND densities of the gradation ND region are set to be in a range of ND 1.7 or less.

Subsequently, a method of manufacturing the gradation ND filter according to any one of the embodiments will be described. The gradation ND filter according to any one of the embodiments is produced by forming the ND evaporation film 9 on the filter base 8.

Figure 14:
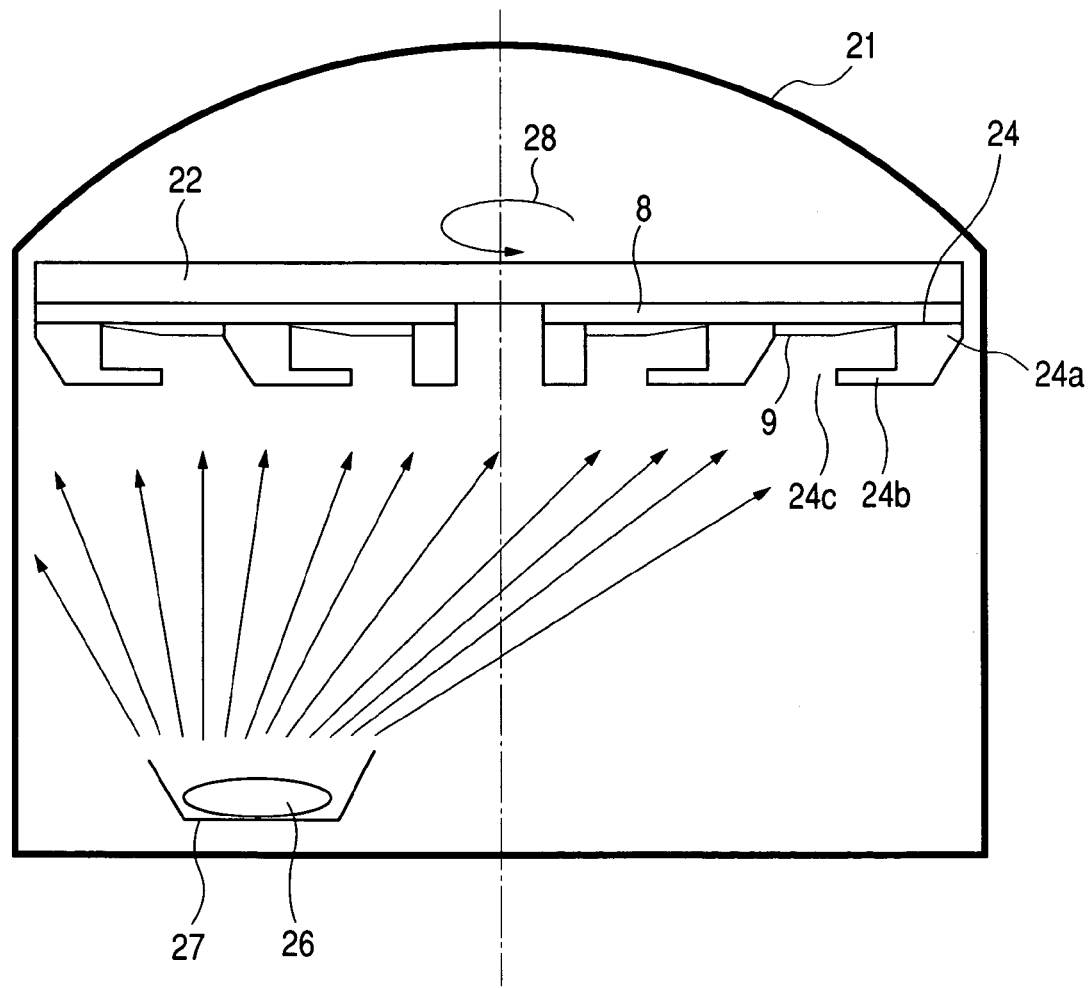
FIG. 14 shows a film formation apparatus for forming an ND evaporation film in the gradation ND filter according to any one of the embodiments.

FIG. 14 is a schematic sectional view showing a film formation apparatus for forming the ND evaporation film 9 on the filter base 8. In FIG. 14, a vacuum evaporation camber 21 includes an evaporation base holding member 22. The filter base 8 is sandwiched between the evaporation base holding member 22 and an evaporation mask 24.

Evaporation materials 26 set in an evaporation source 27 evaporate in a vacuum and the ND evaporation film 9 is formed on the filter base 8 by vacuum evaporation. Plural kinds of evaporation materials 26 are used and different evaporation materials are alternatively evaporated, so that a multi-layer film is formed on the filter base 8. The film formation using vacuum evaporation is conducted while the evaporation base holding member 22 rotates about a rotational axis 28.

The evaporation mask 24 is composed of mask contact portions 24a, mask gap portions 24b, and mask opening portions 24c.

Figure 15:
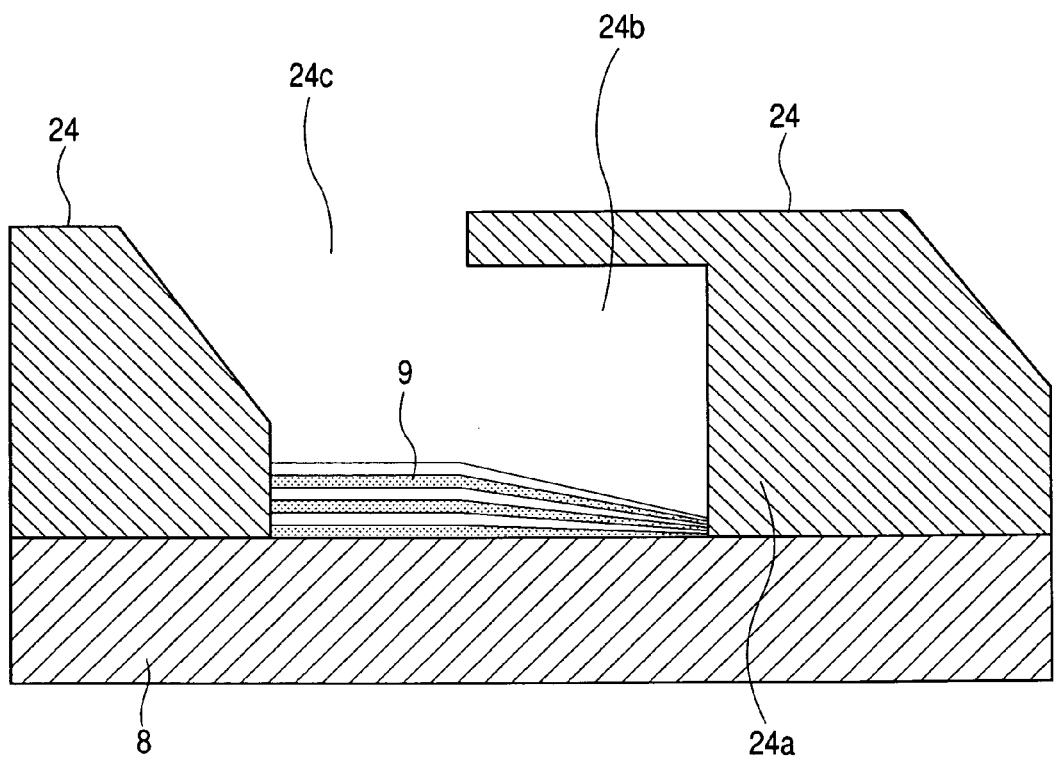
FIG. 15 is an enlarged view showing an evaporation mask portion in the film formation apparatus shown in FIG. 14.

Next, FIG. 15 is an enlarged view showing a portion of the evaporation mask. The mask contact portion 24a is in contact with the filter base 8 to completely block light. Therefore, a film composing the evaporation materials 26 is not formed on a portion of the filter base 8 which is located below the mask contact portion 24a.

The mask gap portion 24b is used to set a suitable gap between the evaporation mask 24 and the filter base 8 to incompletely block light. Using an evaporation material rounding phenomenon during the vacuum evaporation, the multi-layer ND evaporation film 9 which is a sloped film whose film thickness gradually decreases in the direction from the mask opening portion 24c to the mask contact portion 24a is formed on a portion of the filter base 8 which is located below the mask gap portions 24b.

The mask opening portion 24c does not block light, so that the ND evaporation film 9 having a constant film thickness and a constant ND density is formed on a portion of the filter base 8 which is located below the mask opening portion 24c.

The width of the gradation ND region can be suitably controlled by controlling the width of the mask gap portions 24b (width in a direction parallel to the filter base 8). In addition, a gap amount between a portion of the filter base 8 located below the mask gap portions 24b and a protruding portion of the evaporation mask 24 is controlled so that an evaporation material rounding amount is controlled. Accordingly, it is possible to set a sloped film having a suitable film thickness and it is possible to set a density gradient of the gradation ND region according to a change in film thickness.

Here, an evaporation film in a portion corresponding to the cut region 10 of the sloped evaporation film shown in FIG. 2A is eliminated using the mask contact portion 24a. With respect to an extremely thin portion of the sloped evaporation film, a film property becomes unstable and reflectance becomes higher, thereby being difficult in its control. Therefore, such an extremely thin portion is eliminated. The density difference in the density step boundary portion (section C–C') is set to ND 0.1 to ND 0.5.

Thus, the gradation ND filter in which the ND evaporation film is formed on the filter base is produced. Then, the gradation ND filter is processed by cutting to be formed into a desirable size and a desirable shape and then is bonded to the diaphragm blade to manufacture a light amount diaphragm device including the gradation ND filter.

Here, actually, in the case where the gradation ND filter is processed by cutting to be formed into a set size and then bonded to a predetermined position of the diaphragm blade, it is necessary to accurately determine the position of the gradation ND filter to the diaphragm blade. In the case of the gradation ND filter whose density successively changes, because the boundary portion is not present, there is a problem in that it is required to determine a reference position.

Figure 16:
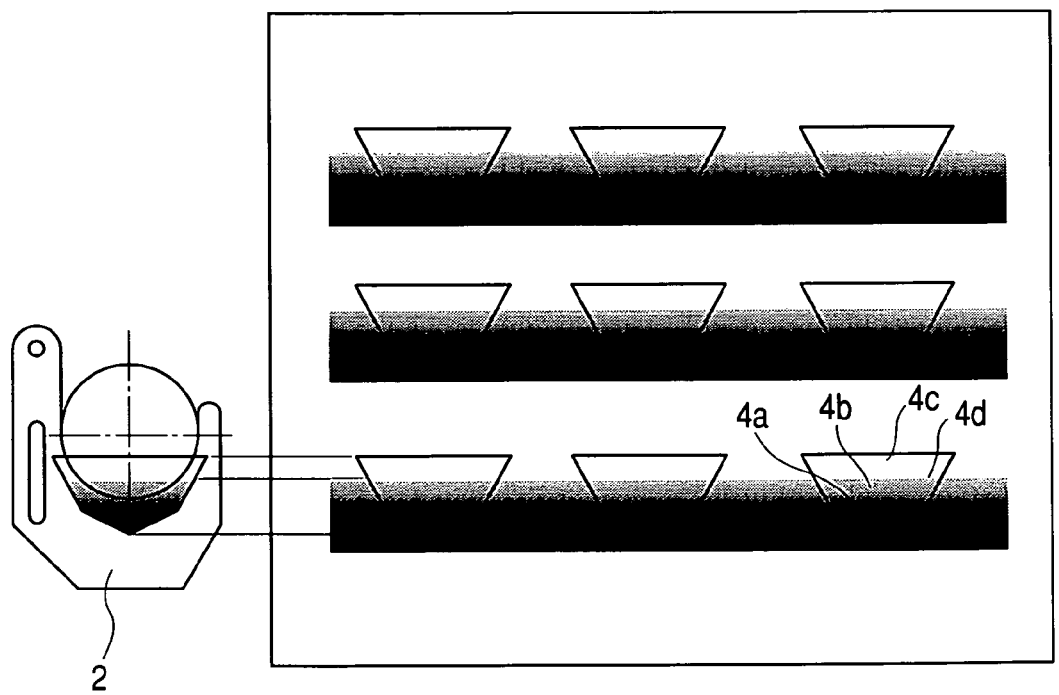
FIG. 16 shows a gradation ND filter before cur processing.

In the case of this embodiment, as shown in FIG. 16, a density step boundary portion 4d is provided between the gradation ND region 4b and the transparent region 4c and determined as a reference position. Therefore, accurate cutting processing of the ND filter and suitable bonding positioning for the diaphragm device are possible.

If the density difference is ND 0.1 or more, the density step boundary portion can be recognized. The density step boundary portion is detected by an image recognition apparatus or the like, positioning is conducted based on the position information of the density step boundary portion, the gradation ND filter is cut out so as to obtain a predetermined size and bonded to a predetermined position of the light amount adjusting device.

In the case where the gradation ND filter is bonded to the predetermined position of the light amount adjusting device, the gradation ND filter which is accurately cut out using the density step boundary portion as the positioning reference can be positioned by mechanical pressing using the cut end surface as a reference.

In the case where the gradation ND filter is more accurately bonded to a predetermined position of the diaphragm blade, it is desirable that the density step boundary portion of the gradation ND filter is detected by an image recognition apparatus or the like and positioning is conducted based on the position information of the density step boundary portion.

If the density difference in the density step boundary portion is increased to the ND density larger than 0.5, the optical performance deteriorates by the influence of diffraction resulting from the density difference and the influence of the film thickness difference required for setting the density difference. Therefore, it is desirable that the density difference is set to the ND density of 0.5 or less.

Next, an embodiment of an optical system including the light amount adjusting device using the gradation ND filter according to any one of the above-mentioned embodiments will be described.

Figure 17:
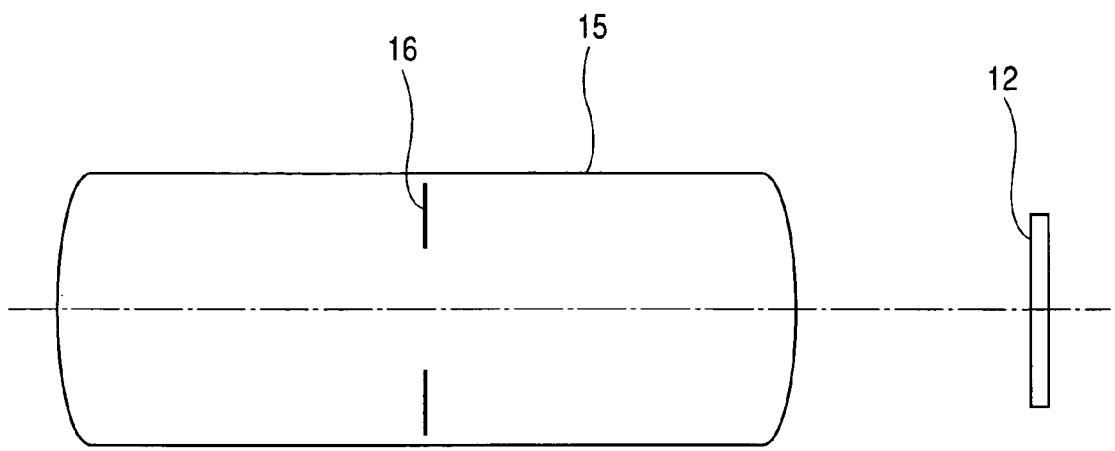
FIG. 17 shows an optical system including the light amount adjusting device according to the present invention.

FIG. 17 is a schematic structural view showing an optical system to which the light amount adjusting device using the gradation ND filter described in the above-mentioned respective embodiments is applied.

In FIG. 17, reference numeral 15 denotes an imaging optical system composed of a refraction system, a reflection system, a diffraction system, and the like; 16, a diaphragm system that controls the amount of light transmitted through the optical system 10 to adjust brightness; and 12, a solid-state image pickup element (photoelectric conversion element) such as a CCD or CMOS that receives a subject image formed by the optical system 15 on a light receiving surface and converts the received subject image into electrical signals. In this embodiment, the light amount adjusting device including the gradation ND filter described in the first to third embodiments is used as the diaphragm 16.

As described above, in the case where the light amount adjusting device including the gradation ND filter described in the first to third embodiments is used as the diaphragm of the optical system such as the imaging optical system, the influence of the transmission wave front phase difference in the ND filter at the light amount limitation can be reduced to improve the image quality. In addition, an image pickup element having a small pixel pitch can be used.

Next, an embodiment of an imaging apparatus including the light amount adjusting device using the gradation ND filter described in the above-mentioned respective embodiments will be described. This embodiment is an embodiment of an imaging apparatus including the optical system shown in FIG. 17.

Figure 18:
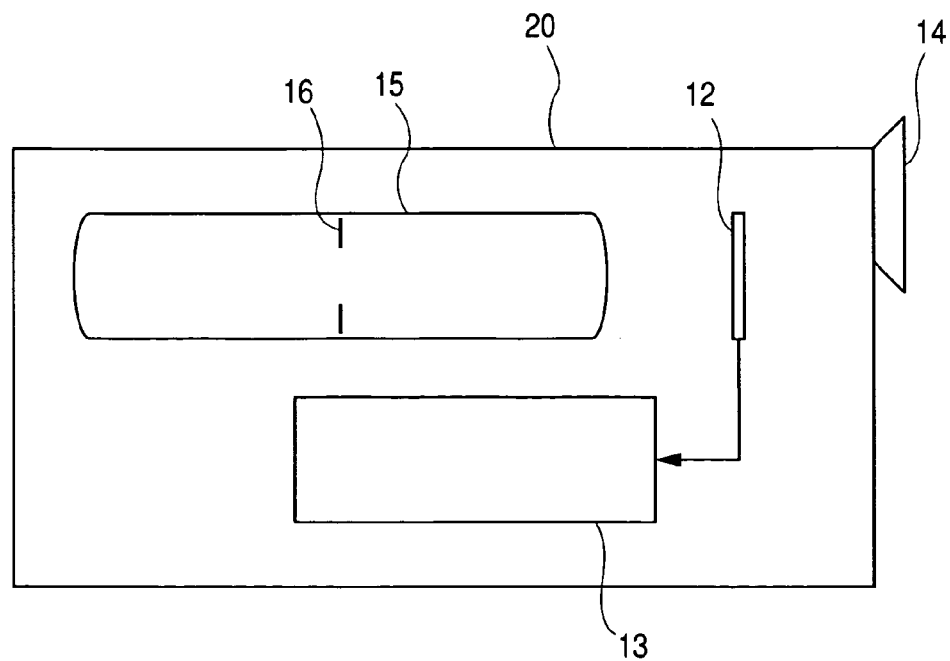
FIG. 18 shows an imaging apparatus including the light amount adjusting device according to the present invention.

In FIG. 18, reference numeral 20 denotes an imaging apparatus main body; 15, the imaging optical system described in the fourth embodiment; 16, the diaphragm serving as the light amount adjusting device using the gradation ND filter described in the above-mentioned embodiments; 12, the solid-state image pickup element that receives the subject image formed by the imaging optical system 15; 13, a recording medium that records the subject image received by the solid-state image pickup element 12; and 14, a finder for observing the subject image. An optical finder or a finder of a type adapted to observe the subject image displayed on a display device such as a liquid crystal panel is considered as the finder 14.

Thus, in the case where the light amount adjusting device according to the present invention is applied to an imaging apparatus of a type such as a video camera or a digital still camera, which forms the subject image on the image pickup element, the influence of the transmission wave front phase difference in the ND filter can be reduced to improve the image quality. In addition, the image pickup element having a small pixel pitch can be used.

What is claimed is:

1. An ND filter comprising:
a base that transmits light having a predetermined wavelength $\lambda$; and
a filter member partially formed on the base,
wherein the filter member has a first region in which a transmittance thereof is constant and a second region in which a transmittance thereof is continuously decreased to a constant value of the transmittance of the first region from a boundary of the filter member in a predetermined direction, and the filter member has a thickness step at the boundary, and a phase difference caused between a first light transmitting through both the filter member and the base in the boundary and a second light transmitting through the base but not the filter member is $\lambda/5$ or less.

2. An ND filter according to claim 1, wherein the filter member has an ND density difference of 0.1 or more and 0.5 or less between the boundary and a peripheral region of the filter member, the transmittance and the ND density satisfying a relationship of transmittance $=10^{-(ND\ density)}$.

3. An ND filter according to claim 1, wherein the filter member has an ND density that continuously changes in an ND density range of 0.1 to 1.7, the transmittance and the ND density satisfying a relationship of transmittance $=10^{-(ND\ density)}$.

4. An ND filter according to claim 1, wherein the filter member is made from a multi-layer film and the transmittance of the filter member changes in accordance with a film thickness of the multi-layer film.

5. An ND filter according to claim 4, wherein an optical film thickness of each layer of the multi-layer film is $\lambda/4$ or less.

6. An ND filter according to claim 1, wherein the wavelength $\lambda$ is 550 nm.

7. A light amount adjusting device, comprising:
a diaphragm blade; and
an ND filter according to claim 1, which is fixedly attached to the diaphragm blade.

8. An optical device, comprising:
a light receiving element; and
an optical system that forms an object image to the light receiving element,
wherein the optical system includes a light amount adjusting device according to claim 7.

9. A method of manufacturing an ND filter according to claim 1, comprising the steps of: using a mask including a region which is in close contact with a base and covers the base and a region which is held at a predetermined interval from the base and covers the base; and depositing a thin film on the base through the mask.

10. A method of manufacturing an ND filter according to claim 9, wherein a film thickness of the thin film deposited on a portion of the base which is covered with the mask in the region which is held at the position apart from the base by the predetermined interval and covers the base continuously changes.

11. A light amount adjusting device, comprising:
a diaphragm blade for forming an aperture; and
an ND filter for attenuating amount of light passing through the aperture and in which a cover ratio of the aperture by the ND filter is changed,
wherein said ND filter having a base; and a filter member partially formed on the base, including a region in which transmittance of the filter member is continuously decreased in a direction from the center of the aperture to the outwards, and a region in which the transmittance of the filter member is constant, and
wherein the region in which the transmittance of the filter member is constant is located outside the region in which the transmittance of the filter member is decreased.

12. A light amount adjusting device according to claim 11, wherein the diaphragm blade changes the size of the aperture, and said ND filter covers the aperture partially in the fully-open state of the diaphragm blade.

13. An optical device comprising:
a light receiving element; and
an optical system that forms an object image to the light receiving element,
wherein the optical system includes a light amount adjusting device according to claim 11.

14. An ND filter comprising:
a base region capable of transmitting light having a predetermined wavelength $\lambda$; and
a filtering region adapted to reduce light transmission as compared to the base region,
wherein the filtering region includes a first region in which a transmittance thereof is constant and a second region in which a transmittance thereof is continuously decreased to a constant value of the transmittance of the first region in a direction from a boundary between the base and the second filtering region towards the first filtering region,
wherein said ND filter has a predetermined gap in transmittance between a first light transmitting through the boundary, and a second light transmitting through the base region, and
wherein the phase difference produced between the first and second lights is $\lambda/5$ or less.

* * * * *